(12) United States Patent
Abdallah et al.

(10) Patent No.: US 11,247,332 B2
(45) Date of Patent: *Feb. 15, 2022

(54) REDUNDANT UNDERACTUATED ROBOT WITH MULTI-MODE CONTROL FRAMEWORK

(71) Applicants: GM GLOBAL TECHNOLOGY OPERATIONS LLC, Detroit, MI (US); UNIVERSITE LAVAL, Quebec (CA)

(72) Inventors: Muhammad E. Abdallah, Rochester Hills, MI (US); James W. Wells, Rochester Hills, MI (US); Pascal Labrecque, Alberta (CA); Clement Gosselin, Quebec (CA); Thierry Laliberte, Quebec (CA)

(73) Assignees: GM Global Technology Operations LLC, Detroit, MI (US); Universite Laval, Quebec (CA)

( * ) Notice: Subject to any disclaimer, the term of this patent is extended or adjusted under 35 U.S.C. 154(b) by 218 days.

This patent is subject to a terminal disclaimer.

(21) Appl. No.: 16/773,388

(22) Filed: Jan. 27, 2020

(65) Prior Publication Data

US 2020/0156245 A1    May 21, 2020

Related U.S. Application Data

(63) Continuation of application No. 15/429,241, filed on Feb. 10, 2017, now Pat. No. 10,583,557.

(51) Int. Cl.
*B25J 9/16* (2006.01)
*B25J 13/08* (2006.01)
*B25J 19/02* (2006.01)
*B25J 9/00* (2006.01)

(52) U.S. Cl.
CPC ........... *B25J 9/1643* (2013.01); *B25J 9/0081* (2013.01); *B25J 9/1633* (2013.01); *B25J 9/1653* (2013.01);
(Continued)

(58) Field of Classification Search
CPC ...... B25J 13/084; B25J 13/085; B25J 13/088; B25J 19/023; B25J 9/0081; B25J 9/1633;
(Continued)

(56) References Cited

U.S. PATENT DOCUMENTS 3,824,674 A    7/1974   Inoyama et al.
3,984,006 A    10/1976  Takeyasu et al.
(Continued)

FOREIGN PATENT DOCUMENTS

CN    1670399 A     9/2005
CN    103086271 A   5/2013
(Continued)

OTHER PUBLICATIONS

Muhammad Addallah, et al. uMan:A Low-Impedance Manipulator for Human-Robot Cooperation Based on Underactuated Redundancy, Jun. 2017, IEEE, vol. 22,No. 3, 1401-1010. (Year: 2017).*

*Primary Examiner* — Rachid Bendidi
(74) *Attorney, Agent, or Firm* — Quinn IP Law

(57) ABSTRACT

A jointed mechanism includes a passive pendulum system attached to and suspended from the multi-axis robot. The system includes one or more position sensors configured to measure a joint angle on the pendulum system, at least one arm, and an end-effector attached to a distal end of the pendulum system. A controller implements a method to selectively control motion of the robot in a plurality of control modes. The control modes include a Cooperative Mode and an Autonomous Mode. The controller is configured to detect contact with the end-effector when operating (Continued)

in the Autonomous Mode, and to automatically initiate a control action in response to the contact. The pendulum system may be a parallelogram arrangement.

17 Claims, 4 Drawing Sheets

(52) U.S. Cl.
CPC .......... *B25J 13/084* (2013.01); *B25J 13/085* (2013.01); *B25J 13/088* (2013.01); *B25J 19/023* (2013.01); *G05B 2219/39195* (2013.01); *G05B 2219/39212* (2013.01)

(58) Field of Classification Search
CPC ............. B25J 9/1653; B25J 9/1643; G05B 2219/39195; G05B 2219/39212
See application file for complete search history.

(56) References Cited

U.S. PATENT DOCUMENTS

| | | | |
|---|---|---|---|
| 5,179,525 A | 1/1993 | Griffis et al. | |
| 6,786,896 B1* | 9/2004 | Madhani | B25J 9/1615 606/1 |
| 9,895,798 B2 | 2/2018 | Helmer | |
| 10,252,415 B2* | 4/2019 | Ishii | B25J 9/0081 |
| 10,407,183 B2 | 9/2019 | Potters et al. | |
| 10,564,635 B2* | 2/2020 | Sato | G05B 19/423 |
| 2013/0158709 A1* | 6/2013 | Shi | B25J 5/02 700/259 |
| 2015/0081099 A1* | 3/2015 | Komatsu | B25J 13/085 700/258 |
| 2015/0100161 A1* | 4/2015 | Malackowski | A61B 34/30 700/258 |
| 2015/0290795 A1* | 10/2015 | Oleynik | A47J 36/321 700/257 |
| 2016/0039093 A1* | 2/2016 | Abdallah | B25J 5/04 700/257 |
| 2016/0214261 A1* | 7/2016 | Davis | B25J 9/1676 |
| 2018/0043525 A1* | 2/2018 | Su | B25J 13/081 |

FOREIGN PATENT DOCUMENTS

| | | |
|---|---|---|
| CN | 103086272 A | 5/2013 |
| DE | 19643347 A1 | 4/1998 |

* cited by examiner

REDUNDANT UNDERACTUATED ROBOT WITH MULTI-MODE CONTROL FRAMEWORK

CROSS-REFERENCE TO RELATED APPLICATIONS

This application is a continuation of U.S. patent application Ser. No. 15/429,241 filed on Feb. 10, 2017, which is hereby incorporated by reference in its entirety.

INTRODUCTION

The present disclosure relates to robotic systems having a robot and an associated controller configured to work collaboratively with a human operator through physical interaction, e.g., a lift-assist device designed to support the weight of a payload while the operator positions the payload. Machine control may be achieved in response to electronic control signals, e.g., from a human-machine interface or a machine-machine interface of an automation system. In some machine configurations, the operator manually acts on the task load while performing dexterous actions while machinery supports and grossly positions the load. Other configurations may be envisioned in which the robot autonomously moves the load without direct physical interaction with the load by the operator.

SUMMARY

A system and associated control framework are disclosed herein for use with tasks involving a robotic mechanism configured to act on an object or the surrounding environment. As used herein, the term "robotic system" refers to an underactuated jointed mechanism with redundant degrees of freedom (DOF). "Underactuated" in the present disclosure means a jointed mechanism in which not all of the joints of the mechanism are actuated, i.e., some of the joints are passive or unactuated. "Redundant" refers to a jointed mechanism having more than the minimum number of joints needed based on the Cartesian DOF of an end-effector of the jointed mechanism, with the end-effector referring to a point of application of the jointed mechanism, e.g., the particular structure that grasps the object, is held by the operator, or that applies a regulated force to the object or environment, or the point whose position is of interest to the task. In other words, the jointed mechanism has extra joints that produce motion in the same Cartesian DOF. Fundamentally, the passive joints would be redundant to a set of active joints, and would lie distally with respect to (e.g., apart from and downstream of) such a set of active joints. The end-effector may be configured such that an operator is able to physically interact with the end-effector or other parts of the jointed mechanism and an external object or surface to perform a manual work task, doing so collaboratively with the jointed mechanism.

The control framework disclosed herein may use a controller that, in some embodiments, regulates the force and/or controls the position of the end-effector, and that may be applied to different modes of operation. A first mode, referred to herein as a Collaborative Mode, may be used when the jointed mechanism is intended to physically interact with the operator to complete a task in collaboration with controlled operation of the jointed mechanism. The second mode, referred to herein as Autonomous Mode, is used when the jointed mechanism is intended to independently complete a task without the direct physical interaction of the operator with the end-effector. With respect to the term "impedance" as used herein, this term refers to the force a system provides in resisting motion. Impedance control thus refers to active control of the robotic system to provide a desired force in resisting such motion in its different orders, where stiffness is the resistance to position, damping is the resistance to velocity, and inertia is the resistance to acceleration, resulting in a $2^{nd}$-order response characteristic of a mass-spring-damper system.

In an example embodiment, the controller is specially programmed to situationally operate the jointed mechanism in one of the two different control modes noted above, i.e., Cooperative Control Mode or Autonomous Mode. Optionally, force control may be used in either control mode to enable the end-effector to apply a particular regulated force to the environment. In the Cooperative Control Mode, the operator and the jointed mechanism both physically act on the end-effector. In the Autonomous Mode, the operator does not physically interact with the end-effector. Instead, the controller autonomously controls a position of the jointed mechanism, or more specifically, of the end-effector. When the force control option is added, the end-effector is able to impart a regulated external force to the object or the surrounding environment.

Central to one aspect of the present approach is the programmed operational function of the controller, which controls the jointed mechanism as if the jointed mechanism is embodied as a classic mass-spring-damper system. In this manner, the controller closely regulates precisely how the jointed mechanism responds to particular forces and the characteristic response, such as being underdamped or overdamped, as such terms are known in the art. Stiffness and/or damping parameters of the modeled mechanism may be manipulated via a controller, with an upper limit potentially set on static forces imparted to the object or environment. For example, the modelled spring force or the regulated force would have an upper bound on their value. Hence, the steady-state force will not exceed a bound.

When operating in the Autonomous Mode, if the end-effector happens to contact structure or an operator in the surrounding environment, the controller may automatically initiate an appropriate response, such as switching or transitioning to the Cooperative Control Mode or executing an emergency stop (e-stop) action. Position sensors may be used with each passive joint of the end-effector, with the controller optionally configured to detect contact with the system based on a deviation of a measured joint position from an expected position, i.e., based on known kinematic/dynamic relationships, via force sensors, or using other suitable approaches.

In certain embodiments, the jointed mechanism may include a relatively large "macro-mechanism" that includes all of the actively-driven (actuator-driven) joints of the jointed mechanism. Such a macro-mechanism may be placed proximally in series with a smaller, relatively light-weight "mini" mechanism. The mini mechanism may have only passive joints, which may be linear/translational in various directions and/or rotational, and which in turn may be adjusted solely by forces that are input to the end-effector by the operator or by contact with the environment. The passive joints are restored to an equilibrium position using a passive restoring force, for instance from a spring or gravity.

The jointed mechanism may be functionally represented as a classic cart and pendulum system with gravity or springs used as a restoring force, i.e., a force returning the end-effector to an equilibrium position. The dynamics of such a system may be modeled in the controller described herein, with the Autonomous Mode and the Cooperative Control Mode programmed as two distinct operating modes available to the controller or to the operator as the situation dictates. Impedance control may be used to act as a single control framework for both control modes, which facilitates autonomous transitioning between the available control modes. A control decision is then made by the controller in real time as to the optimal behavior for the robot or macro-mechanism to follow.

A particular embodiment of a jointed mechanism includes a passive pendulum system attached to and suspended from the multi-axis robot. The passive pendulum system includes one or more position sensors configured to measure a joint angle on the pendulum system, at least one arm, and an end-effector attached to a distal end of the pendulum system. A controller is in communication with the sensors, and is configured to selectively control the robot in a plurality of control modes. The modes include a Cooperative Mode in which the controller is configured, in response to an operator physically interacting with the end-effector, to cause a displacement in the pendulum system from an equilibrium position, and in which the controller is configured to command the robot to move and thereby close the displacement to return the pendulum system to the equilibrium position, and an Autonomous Mode. In the Autonomous Mode, the robot moves without physical contact between the end-effector and operator. The controller is configured to detect contact with the end-effector when operating in the Autonomous Mode, and to automatically initiate a control action in response to the contact.

A method for controlling the jointed mechanism includes measuring rotational passive joint positions on the pendulum system using position sensors, and then outputting position signals indicative of the rotational passive joint positions to a controller. In response to the position signals, the method includes using the controller to selectively control motion of the robot in the above-noted control modes.

The jointed mechanism in another embodiment includes a horizontal overhead support beam, an actuated positioning mechanism connected to and configured to translate along the overhead support beam in two horizontal Cartesian degrees of freedom, and a passive parallelogram arrangement attached to and suspended from the positioning mechanism. The arrangement includes one or more position sensors configured to measure a joint angle on the passive parallelogram arrangement, a cross member connected to parallel arms, and an end-effector attached to the cross member at a distal end of the passive parallelogram arrangement. The end-effector is configured to translate in the two horizontal degrees of freedom in conjunction with motion of the positioning mechanism. A controller is configured to execute at least the above-noted control modes.

The above features and advantages, and other features and advantages of the present disclosure, will be readily apparent from the following detailed description of the embodiment(s) and best mode(s) for carrying out the disclosure when taken in connection with the accompanying drawings and appended claims.

DETAILED DESCRIPTION

Figure 1:
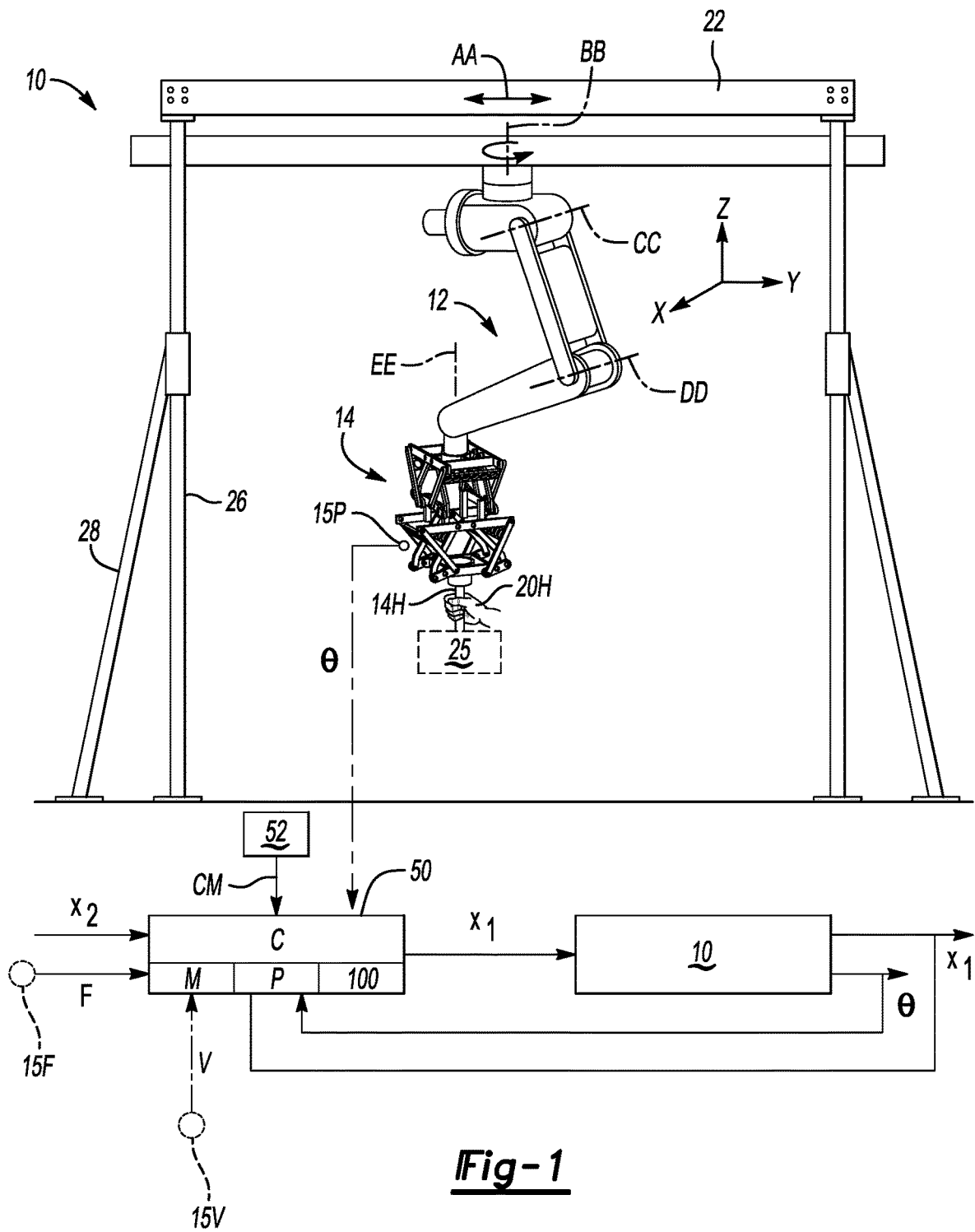
FIG. 1 is a schematic illustration of a robotic system utilizing a controller with a redundant, underactuated mechanism according to an embodiment of the disclosure.

Several embodiments of the disclosure are illustrated in the accompanying drawings. The same or similar reference numerals are used in the drawings and the description to refer to the same or similar structure. The drawings are in simplified form and are not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure.

An example robotic system 10 is shown in FIG. 1 that is configured, cooperatively with a human operator 20H (only the hand of which is shown for simplicity), to support and control a position of a payload, work tool, or other object 25. The robotic system 10 includes a jointed mechanism 12 that contains all of the joints, and thus all available control degrees of freedom (DOF), of the robotic system 10. In some embodiments, the jointed mechanism 12 may include a relatively large "macro" mechanism, e.g., a multi-axis robot as shown, which in turn may be connected to a passive "mini" mechanism 14 to form a macro-mini robotic mechanism. The mini mechanism 14 may include an end-effector 14H, which may be a particular portion of the jointed mechanism 12 that serves as the point of application for a given task, e.g., the particular structure of the jointed mechanism 12 that grasps the object 25, is held by the operator 20H, or applies a force to the environment of the object 25. The jointed mechanism 12 thus provides the robotic system 10 with multiple control DOF, some of which are actively controlled ("active DOF") and some of which are free to move in response to forces from an operator or the environment, i.e., "passive DOF."

In the non-limiting embodiment shown in FIG. 1, the jointed mechanism 12 includes overhead support beams 22 having an active/actuated linear positioning mechanism, e.g., a two linear DOF gantry or overhead bridge crane possibly supported by vertical and angled support beams 26 and 28, respectively. In such an embodiment, movement of the jointed mechanism 12 along the overhead support beams 22 in the direction of arrow AA may be actuated via motors, chains, belts, or the like (not shown) so that the end-effector 14H and the object 25 are able to translate along the overhead support beams 22 as needed. Likewise, rotational motion around axis BB normal to the direction of translation (arrow AA) may be provided by similar devices. The jointed mechanism 12 may include multiple other axes, e.g., CC, DD, and EE, with linear and/or rotational motion occurring within a typical three-dimensional Cartesian XYZ reference frame.

The mini mechanism 14, a non-limiting example of which is shown in FIG. 1 and disclosed in U.S. application Ser. No. 15/284,043 filed on Oct. 3, 2016 which is hereby incorporated by reference in its entirety, is an example configuration providing one or more passive DOF. Each passive DOF, or more precisely each joint whose range of motion corresponds to a given passive DOF, includes a corresponding joint position sensor 15P configured to measure a position of a corresponding translational and/or rotational joint of the mini mechanism 14 and output data in the form of joint positions (arrow θ) as part of the ongoing function of the robotic system 10, with one such joint position sensor 15P shown in FIG. 1 for illustrative simplicity. Optional additional sensors generating different types of data may include force sensors 15F detecting or measuring force data (arrow F) and/or vision sensors 15V detecting or measuring vision data (arrow V), e.g., image-based positional data captured via one or more digital cameras, video records, or the like.

The robotic system 10 includes a controller (C) 50, which in some embodiments is an impedance controller of the type described below. The controller 50 may be programmed to receive such data during a manual work task and identify an occurrence of an error or a completion of the manual task using the received data. The controller 50 may be embodied as one or more digital computers having a processor (P) and memory (M). The memory (M) includes sufficient amounts of tangible, non-transitory memory, e.g., read only memory, flash memory, optical and/or magnetic memory, electrically-programmable read only memory, and the like. Memory (M) also includes sufficient transient memory such as random access memory, electronic buffers. Hardware of the controller 50 may include a high-speed clock, analog-to-digital and digital-to-analog circuitry, and input/output circuitry and devices, as well as appropriate signal conditioning and buffer circuitry.

Figure 2:
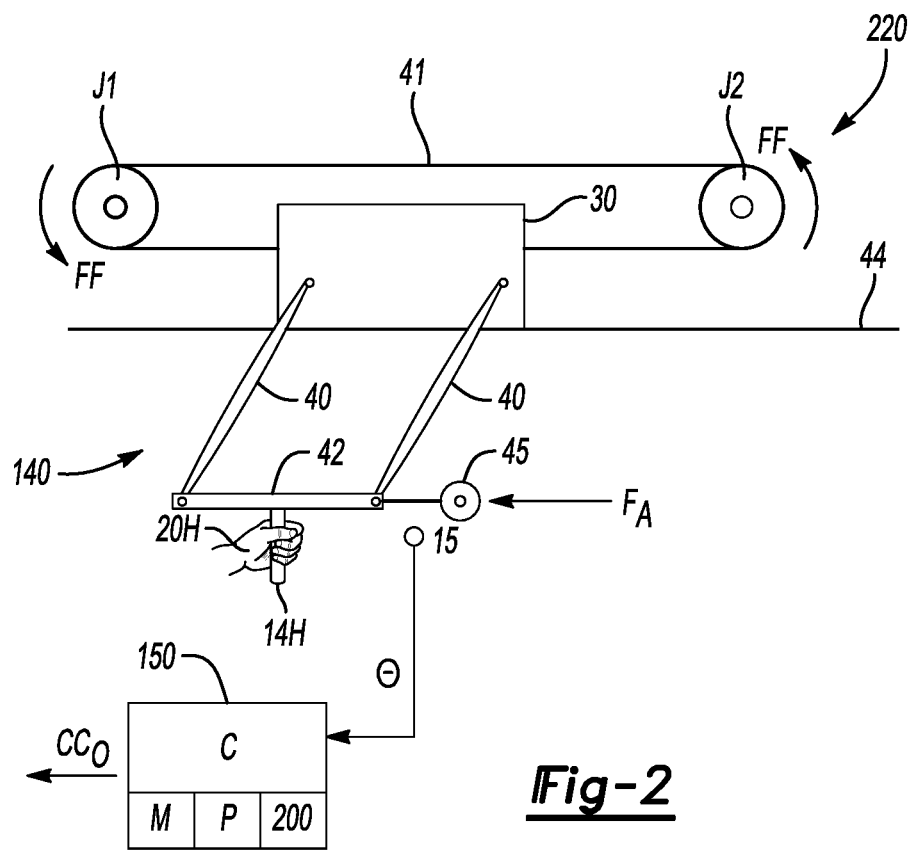
FIG. 2 is a schematic illustration of an example single degree of freedom (DOF) redundant, underactuated mechanism usable with the robotic system of FIG. 1 or as part of an optional force-controlled architecture.

The memory (M) may be programmed with computer-readable instructions 100 enabling the controller 50 to control active joints, brakes, and/or locking mechanisms of the robotic system 10 as needed to execute and switch between the available control modes (arrow CM) noted above, i.e., the Autonomous Mode and the Cooperative Control Mode, with force control modes also available or, in the example embodiment of FIG. 2, available separately. An interface 52, e.g., human-machine such as a touch screen or machine-machine in logic, may be used to facilitate determination of the control modes (arrow CM), e.g., by an operator manually selecting one of the control modes or the controller 50 may determine and select the optimal control mode in real time based on detected interactions with the end-effector 14H. As explained below, the controller 50 may receive a desired position (arrow $x_2$), generate and transmit a commanded position ($x_1$) to the robotic system 10, and receive the measured joint positions (arrow θ) as position feedback in the overall control of the robotic system 10.

Referring briefly to FIG. 2, an example jointed mechanism 220 may be used with the impedance controller 50 of FIG. 1 and/or with a force controller (CF) 150 as shown in FIG. 2, with the force controller 150 having memory (M) and a processor (P) as with the controller 50 of FIG. 1. Also like the jointed mechanism 12 of FIG. 1, the jointed mechanism 220 of FIG. 2 may include multiple active joints, depicted in FIG. 2 as rotary joints J1 and J2 which rotate in the direction of arrows FF, and in the opposite direction as needed, in order to move a belt 41 or other suitable drive mechanism. Attached to the belt 41 is a cart 30 which may be translated with respect to a surface 44 via controlled operation of the active DOFs. A mini mechanism 140 in the form of a passive single or double parallelogram arrangement having parallel arms 40 and a cross member 42 is connected to the parallel arms 40 may be attached to and suspended from the cart 30. An end-effector 45, e.g., a roller, may be moved by the operator 20H and configured to impart a force (arrow $F_A$), such as in the example of a rolling force in a rolling operation of the type used to spread and expel adhesive material from a panel assembly (not shown).

The controller 150 in such an embodiment may receive joint position signals (arrow θ) from a corresponding position sensor 15P and, using the recorded instructions 200, perform an error-proofing operation resulting in an output signal (arrow $CC_o$). By way of example, some operations require a manual application of force, such as the example panel adhesive operation noted above. Variation in the force applied via an actuator 45 may result in differences in adhesion quality around a perimeter of such a panel. By using force control with the jointed mechanism 220 with the mini mechanism 140 as a redundant, underactuated robotic system alternative to the robotic system 10 of FIG. 1, either alone or using the structure of FIG. 2 with the impedance controller 50 of FIG. 1, it may be possible to verify the forces applied to the panel, compare such forces to calibrated force thresholds, and thereby error proof the operation while also assisting the operator in the performance of a largely manual task. The output signal (arrow $CC_o$) in such an embodiment may activate a signal lamp, generate a message indicative of the location and amount of a potential variation of an applied force from the calibrated force, etc. During such action, the controller 50 may also detect contact with the object 25 or the environment based on a deviation of the measured joint motion from an expected joint motion. As used herein, the term joint motion may encompass position, velocity, and/or acceleration. Automatic control actions may thereafter be executed in response to the detected contact, such as switching over to the Cooperative Control Mode or executing an emergency stop (e-stop) action.

As will be now be described with particular reference to FIGS. 3A-4, the example impedance controller 50 of FIG. 1 is configured to provide a single intuitive control formulation for use with a redundant underactuated robotic mechanism such as the jointed mechanism 12 of FIG. 1 or the alternative jointed mechanism 220 shown in FIG. 2. The controller 50 may achieve its programmed functionality using a linear or a cart-pendulum model of the end-effector 14H and the object 25, with the linear approach described with reference to FIG. 3A and the cart-pendulum approach described with reference to FIG. 3B.

A moving cart-pendulum system may be exemplified as the overhead configuration of FIGS. 1 and 2. As shown in FIG. 1, part of the present approach, the controller 50 may receive or determine the appropriate control mode (arrow CM), and also determine input forces (arrow F) to the end-effector 14H and the desired position (arrow $x_2$) of the object 25. The controller 50 may output the commanded position (arrow $x_1$) as an electronic signal to joint actuators/associated joint motor control processors the robotic system 10. The measured positions (θ), e.g., the various joint angles of the robotic system 10, are fed back to the impedance controller 50. The controller 50 then executes the following control logic, embodied as the instructions 100, in achieving the desired control goals.

Impedance Control Law

The behavior of the robotic system 10 may be modeled in logic of the impedance controller 50 of FIG. 1 as a linear mass-spring-damper system producing a desired $2^{nd}$ order behavior. In such a mass-spring-damper system, a force may be applied to a mass (m), with the controlled dynamics of an end-effector of such a modeled robotic system 10 represented as:

$$m\ddot{x}+b\dot{x}+k\Delta x=\Delta F$$

with $\Delta x$ being the change in a position (x) of the mass (m) in response to a change in force ($\Delta F$). Thus, using impedance control of the controller 50 of FIG. 1, the stiffness of an interaction can be specified in logic of the controller 50. For instance, impedance may be modeled as a spring-mass-damper system having stiffness and damping parameters, with the controller 50 programmed to control the jointed mechanism 12 by manipulating a stiffness and/or a damping parameter as described below.

The present approach is based on a computer technique formulation, and thus applies to both control modes of the controller 50 without requiring linearization or estimation of the force. Moreover, the present approach operates directly in the operational space of the end-effector 14H of FIG. 1, not in the joint space, thereby facilitating dynamic analysis of interactions with an operator. The same approach facilitates simple position control of the end-effector 14H without requiring double integration of an acceleration command.

Linear Model

Figure 3A:
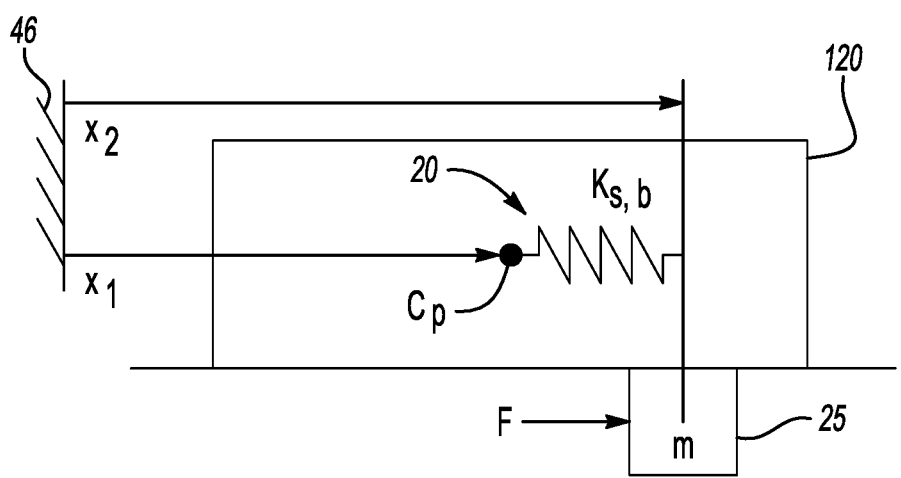
FIGS. 3A and 3B are respective linear and non-linear single DOF models of the robotic system shown in FIG. 1, with either or both models usable by the impedance controller of FIG. 1.

Referring to FIG. 3A, the mass (m) may be represented as being connected to a cart 120 via a spring 20 having a spring constant ($k_s$), with the schematic cart 120 corresponding the jointed mechanism 12 or macro mechanism of the robotic system 10. The spring 20, represented as being connected in such a model to a stationary member 46 and a center point (Cp) of the cart 120, also has a damping coefficient (b). Force (arrow F) may be applied to the mass (m). $\Delta x$ noted above is therefore equal to $x_2 - x_1$ in FIG. 3A. The robotic system 10 of FIG. 1 uses gravity as a type of pendulum for the restoring force when the mass (m), i.e., the object 25 of FIG. 1, is released. Thus, a desired impedance relationship for the end-effector may be modeled or represented as:

$$m\ddot{x}_2 + b\dot{x}_2 + F_{SS} = F \quad (1)$$

$$F_{SS} = \begin{cases} k(x_2 - x_2^*), & \text{Autonomous} \\ F^*, & \text{Cooperative} \end{cases} \quad (2)$$

where m is the mass of the end-effector 14H, b is the desired damping coefficient, k is the desired stiffness, i.e., the actively-controlled effective stiffness, and $x_2^*$ is the reference position of the mass (m). F in the above-noted formulation is the external force on the mass (m) from the operator and F* is the commanded force from the controller 50. The steady-state force $F_{SS}$ is thus determined as noted in equation (2) differently in the Autonomous Mode and the Cooperative Control Mode.

Force analysis on the end-effector 14 of FIG. 3A provides the following equation of motion, neglecting friction:

$$m\ddot{x}_2 = F + k_s(x_1 - x_2) \quad (3)$$

where $k_s$ is the actual physical stiffness of the spring 20 used in the model (a constant). Assuming the jointed mechanism 12/cart 120 employs a $1^{st}$ order position controller:

$$\dot{x}_1 = -k_p(x_1 - x_1^*) \quad (4)$$

where $k_p$ is a proportional gain and $\dot{x}_1$ is proportional to error in position of the cart 120/robot 12. Solving from equations (1) and (2), the control law for the desired macro position follows as:

$$x_1^* = x_2 - \frac{b}{k_s}\dot{x}_2 - \frac{1}{k_s}F_{ss} \quad (5)$$

Closed-Loop Dynamics

Assuming a perfect $1^{st}$ order controller, the dynamics of the jointed mechanism 12 follows:

$$\frac{x_1}{x_1^*} = \frac{1}{\alpha s + 1} \quad (6)$$

where $$\alpha = \frac{1}{k_p}.$$

In the Autonomous Mode, closed-loop dynamics may be provided from equations (3), (5), and (6) in the Laplace domain as follows:

$$ms^2 x_2 = F - k_s(x_2 - x_1) \quad (7)$$

$$(ms^2 + k_s)x_2 = F + \frac{k_s}{\alpha s + 1}x_1^*$$

$$(\alpha m s^3 + ms^2 + \alpha k_s s + bs + k)x_2 = kx_2^* + (\alpha s + 1)F$$

When operating in the Autonomous Mode, the controller 50 is concerned with the position of the end-effector 14. Thus, the following transfer function follows, assuming F=0:

$$\frac{x_2}{x_2^*} = \frac{k}{\alpha m s^3 + ms^2 + (b + \alpha k_s) + k} \quad (8)$$

As the jointed mechanism 12 speeds up, i.e., as a becomes smaller, the transfer function of equation (8) approaches the desired $2^{nd}$ order response behavior.

Figure 5:
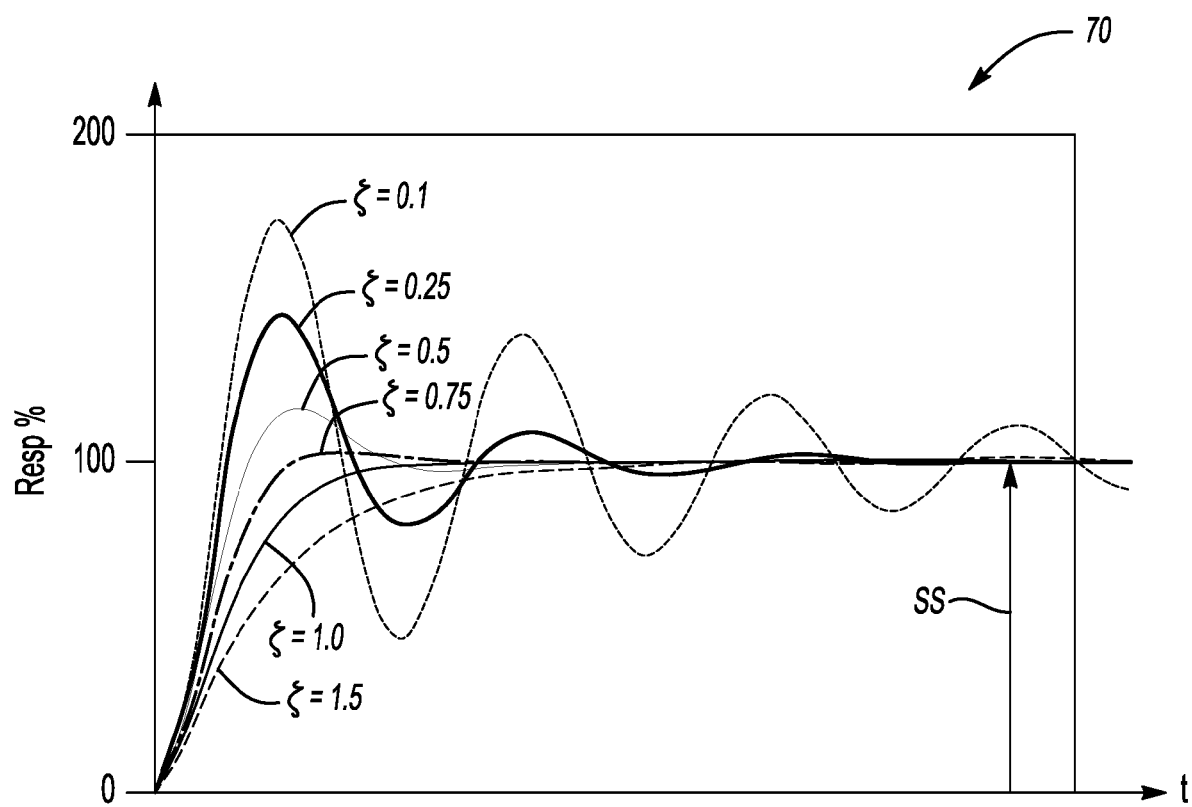
FIG. 5 is a time plot depicting the dynamic effects of damping on the jointed mechanism described herein, with a percentage of damping response plotted on the vertical axis and time plotted on the horizontal axis.

As noted above, impedance control offers the opportunity to model the behavior of an active system like that of a simple mass-spring-damper system to obtain the desired $2^{nd}$ order response behavior. The dynamic response of such a mass-spring-damper system is shown schematically in the response plot 70 of FIG. 5. The position is depicted on the vertical axis as percentage of the input (Resp %), with time (t) plotted on the horizontal axis. $\zeta$ the damping factor, depicts an under-damped condition when $\zeta$ is in a range of 0 to around 0.75, e.g., 0.1, 0.25, 0.5, and 0.75 as shown, with a steady-state damping response indicated by arrow SS. $\zeta$=1.0 represents a critically-damped condition. $\zeta$=1.5 representing an over-damped condition. Thus, modeling and controlling the system 10 described above as a mass-spring-damper system allows a desired control response to be achieved via the controller 50. For instance, the controller 50 may be programmed to control the jointed mechanism 12 in the Autonomous Mode so that the end-effector 14H or another end-effector connected to and positioned distally from passive joints of the jointed mechanism 12 does not exhibit under-damped oscillations.

In the Cooperative Control Mode, intuitiveness of control is of primary concern to the controller 50 of FIG. 1. This entails evaluation of the motion response for a given input force. The following transfer function thus follows, where F*=0:

$$\frac{\dot{x}_2}{F} = \frac{\alpha s + 1}{\alpha m s^2 + ms + b + \alpha k_s} \quad (9)$$

In this case, as the jointed mechanism 12 speeds up, the response approaches a $1^{st}$ order response. Such $1^{st}$ order behavior, without oscillations of the mass (m) or the end-effector 14H, is a targeted behavior to result in the most intuitive interaction for cooperative manipulation. Speeding up the jointed mechanism 12 reduces the severity of oscillations for an overdamped behavior without reducing response time.

Figure 4:
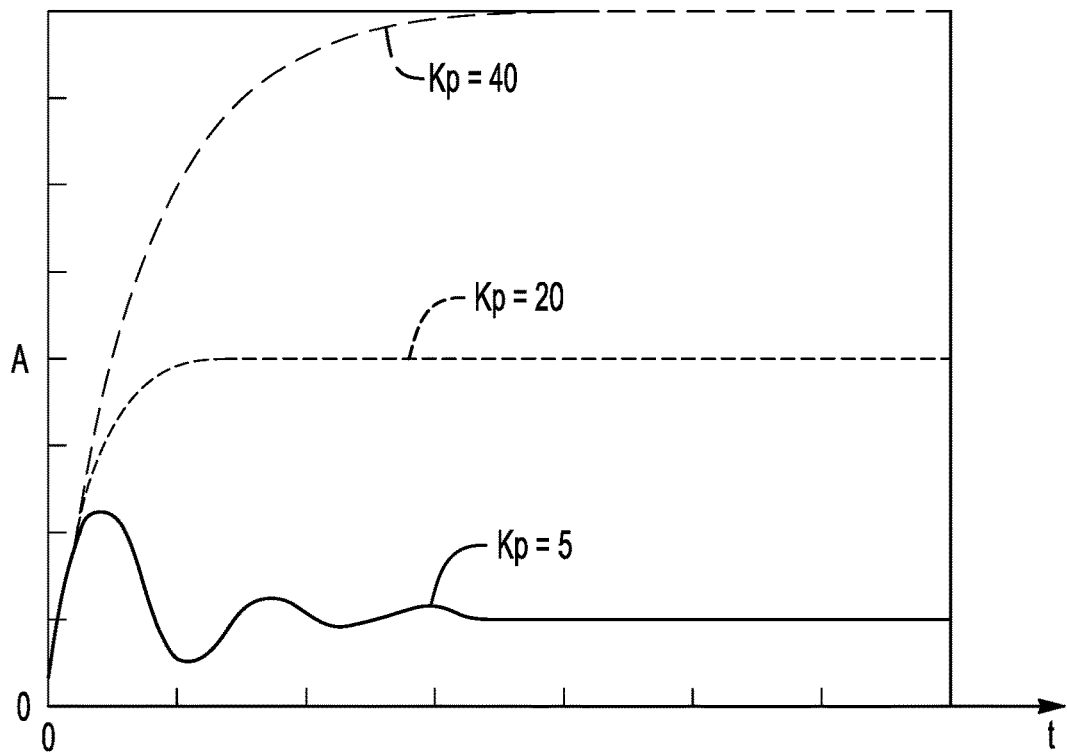
FIG. 4 is a time plot of a velocity response for the representative cart and pendulum model of the end-effector as shown in FIG. 3B, with gain amplitude depicted on the vertical axis and time depicted on the horizontal axis.

Referring to FIG. 4, an example step response is shown for the robotic system 10 of FIG. 1, where the m=1 and $k_s$=100. Increasing the gain of the controller 50 dampens out the response without slowing the response down. Such behavior, without oscillations, makes manipulation of the object 25 by the operator more intuitive. This response also represents the impulse response for position. Additionally, a proportional gain $k_p$ with a larger amplitude (A) increases the steady-state gain, with examples of $k_p$=5, $k_p$=20, and $k_p$=40 depicted in FIG. 4. The steady-state gain of the robotic system 10 may be represented as $$\frac{k_p}{bk_p + k_s}.$$

Hence, increasing the value of $k_p$ also increases the low-frequency gain of the robotic system 10. In other words, less force is required to achieve the same velocity.

It is desirable to have the jointed mechanism 12 respond as quickly as possible, given the $1^{st}$ order position follower behavior demonstrated above. The faster the jointed mechanism 12 can respond, the more intuitive an interaction with an operator will be, and with less effort required. In Autonomous Mode, the damping coefficient b adds damping to reduce oscillations, which may be desirable. In Cooperative Mode, the damping coefficient b adds effective stiffness to the response. It thus increases the tendency to oscillate, which is generally undesirable. It also decreases the steady-state gain, which may be beneficial as explained below. It can be shown that a window of damping exists that allows both control modes to be overdamped with the same b value. Otherwise, different values can be used for each control mode.

Non-Linear Model

Figure 3B:
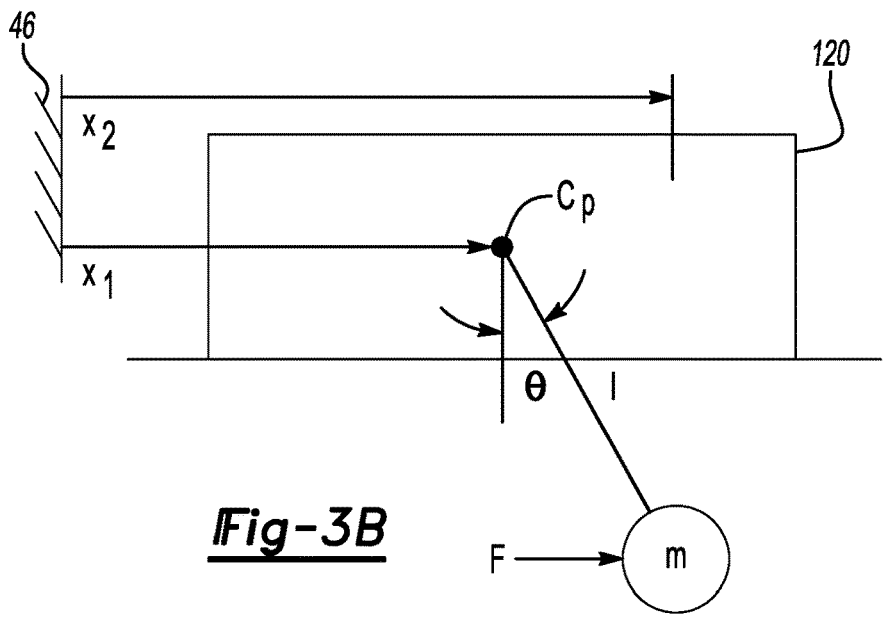

Referring to FIG. 3B, a cart-pendulum model may be used for the mini mechanism 14 where gravity provides the restoring force. The equation for motion for a cart-pendulum system may be represented as follows, with g being the gravitational constant:

$$0 = \ddot{x}_2 + \dot{\theta}^2 l \sin\theta + (\cos^2\theta - 1)\ddot{x}_1 + g \sin\theta \cos\theta \quad (10)$$

Here, l is the length of the pendulum shown in FIG. 3B. To solve for the control law, the term $(\cos^2 \theta - 1) \ddot{x}_1$ may be assumed to be insignificant. Small angles or small accelerations are deemed present. This allows the controller 50 to control the impedance of the mini mechanism 14 using the position of the jointed mechanism 12 as follows:

$$0 = \ddot{x}_2 + \dot{\theta}^2 l \sin\theta + g \sin\theta \cos\theta \quad (11)$$
$$0 = \ddot{x}_2 + \left(\dot{\theta}^2 + \frac{g}{l}\cos\theta\right) l \sin\theta$$

Since $l\sin\theta = x_2 - x_1$, the desired acceleration can be found from the impedance relationship (1) noted above. Solving for the control law:

$$x_1^* = x_2 - \frac{b}{k_{pend}} \dot{x}_2 - \frac{1}{k_{pend}} F_{ss} \quad (12)$$

where $$k_{pend} = m\left(\dot{\theta}_2 + \frac{g}{l}\cos\theta\right).$$

The parallel to relationship (5) above is thus apparent.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

What is claimed is:

1. A jointed mechanism comprising:
   a multi-axis robot; and
   a passive pendulum system attached to and suspended from the multi-axis robot, the passive pendulum system having an equilibrium position and including:
      one or more position sensors configured to measure one or more joint angles on the passive pendulum system;
      at least one arm; and
      an end-effector attached to the at least one arm at a distal end of the pendulum system; and
   a controller in communication with the one or more position sensors, wherein the controller is configured, in response to the one or more joint angles, to selectively control the robot in a plurality of control modes, including:
      a Cooperative Mode configured, in response to a physical interaction by a human operator with the end-effector, to cause a displacement in the passive pendulum system from the equilibrium position, and in which the controller is configured to command the robot to move in such a manner as to close the displacement and thereby return the passive pendulum system to the equilibrium position; and an Autonomous Mode configured to move the robot without a physical interaction with the end-effector by the human operator, wherein the controller is configured to detect unexpected contact with the end-effector when operating in the Autonomous Mode based on a deviation of a measured joint motion of the passive pendulum system from an expected joint motion, and to automatically initiate a control action in response to the unexpected contact.

2. The jointed mechanism of claim 1, wherein the at least one arm includes parallel arms, the passive pendulum system is a passive parallelogram arrangement having a cross member connected to the parallel arms, and the end-effector is connected to the cross member at the distal end.

3. The jointed mechanism of claim 2, wherein the passive parallelogram arrangement is configured to allow the end-effector to translate in two Cartesian horizontal degrees of freedom.

4. The jointed mechanism of claim 1, wherein the control action includes executing an automatic stop in motion of the robot.

5. The jointed mechanism of claim 1, wherein the control action includes an automatic transition from the Autonomous Mode to the Cooperative Control Mode.

6. The jointed mechanism of claim 1, wherein the controller is programmed to control the jointed mechanism in the Autonomous Mode in a manner that ensures the end-effector does not exhibit under-damped oscillations.

7. A method for controlling a jointed mechanism having a multi-axis robot and a passive pendulum system attached thereto and suspended therefrom, the method comprising:
measuring rotational joint positions on the passive pendulum system using a plurality of position sensors;
outputting position signals indicative of the rotational joint positions to a controller; and
in response to the position signals, using the controller to selectively control motion of the robot in a plurality of control modes, including:
a Cooperative Mode configured, in response to a physical interaction by a human operator with the end-effector, to cause a displacement in the passive pendulum system from an equilibrium position, and in which the controller is configured to command the robot to move in such a manner as to close the displacement and thereby return the passive pendulum system to the equilibrium position; and
an Autonomous Mode configured to move the robot without a physical interaction with the end-effector by the human operator, wherein the controller is configured to detect unexpected contact with the end-effector when operating in the Autonomous Mode, and to automatically initiate a control action in response to the contact, wherein detecting the unexpected contact is based on a deviation of a measured joint motion of the passive pendulum system from an expected joint motion.

8. The method of claim 7, wherein the passive pendulum system includes at least one arm attached to the end-effector and to the robot.

9. The method of claim 7, further comprising:
moving the robot in the Cooperative Mode and the Autonomous Mode by translating the end-effector in a first Cartesian horizontal degree of freedom; and
translating the end-effector in a second Cartesian horizontal degree of freedom that is different than the first Cartesian horizontal degree of freedom.

10. The method of claim 9, wherein the robot includes a horizontal overhead support beam, and wherein translating the end-effector occurs along an axis of the overhead support beam.

11. The method of claim 7, wherein the control action includes regulating a force applied to an object by the end-effector.

12. The method of claim 7, wherein the control action includes executing an automatic stop in motion of the robot.

13. The method of claim 7, the method further comprising:
receiving data via the controller during a work task; and
identifying an occurrence of an error or a completion of the work task using the received data, wherein the data includes position data, force data, and/or vision data.

14. A jointed mechanism comprising:
a horizontal overhead support beam;
a robot, including an actuated positioning mechanism connected to and configured to translate along the overhead support beam in two Cartesian degrees of freedom;
a passive parallelogram arrangement attached to and suspended from the actuated positioning mechanism, having an equilibrium position, and including:
one or more position sensors configured to measure one or more joint angles on the passive parallelogram arrangement;
parallel arms;
a cross member connected to the parallel arms; and
an end-effector attached to the cross member at a distal end of the passive parallelogram arrangement; and
a controller in communication with the one or more position sensors, wherein the controller is configured, in response to the one or more joint angles, to selectively control the passive parallelogram arrangement in a plurality of control modes, including:
a Cooperative Mode configured, in response to a physical interaction by a human operator with the end-effector, to cause a displacement in the passive parallelogram arrangement from the equilibrium position, and in which the controller is configured to command the robot to move in such a manner as to close the displacement and thereby return the passive parallelogram arrangement to the equilibrium position; and
an Autonomous Mode configured to move the robot without a physical interaction with the end-effector by the human operator, wherein the controller is configured to detect unexpected contact with the end-effector when operating in the Autonomous Mode based on a deviation of a measured joint motion of the passive pendulum system from an expected joint motion, and to automatically initiate a control action in response to the unexpected contact.

15. The jointed mechanism of claim 14, wherein the control action includes an automatic transition from the Autonomous Mode to the Cooperative Control Mode.

16. The jointed mechanism of claim 14, wherein the control action includes executing an automatic stop in motion of the robot.

17. The jointed mechanism of claim 14, wherein the controller is programmed to control the jointed mechanism in the Autonomous Mode in a manner that ensures the end-effector does not exhibit under-damped oscillations.

* * * * *